Dec. 6, 1966  A. CLEMENTS  3,289,450

CAN EXTRUSION MACHINE

Filed Nov. 26, 1963  4 Sheets-Sheet 2

INVENTOR.
ALBERT CLEMENTS

BY Toulmin & Toulmin

ATTORNEYS

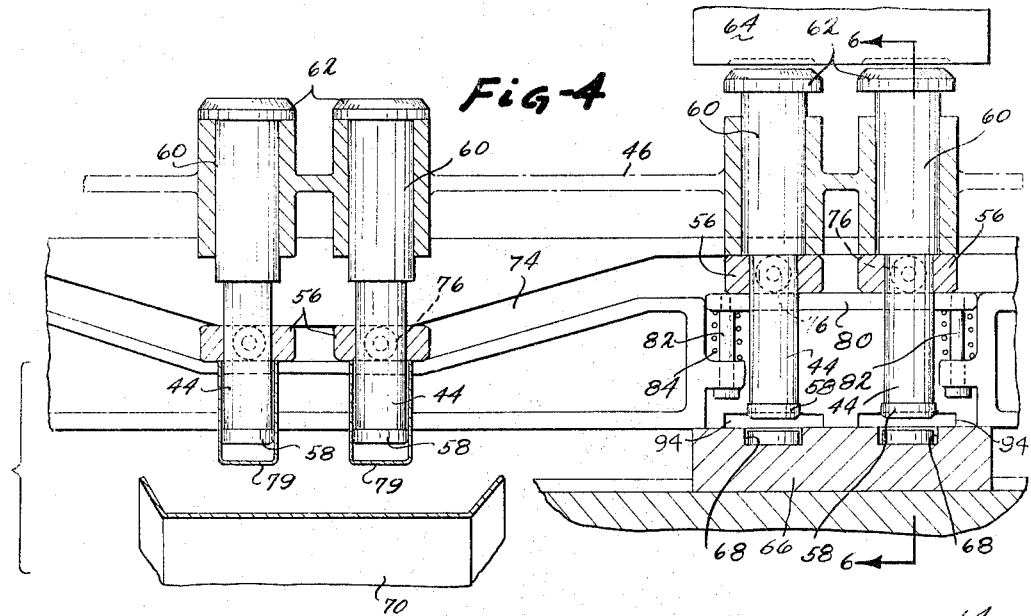
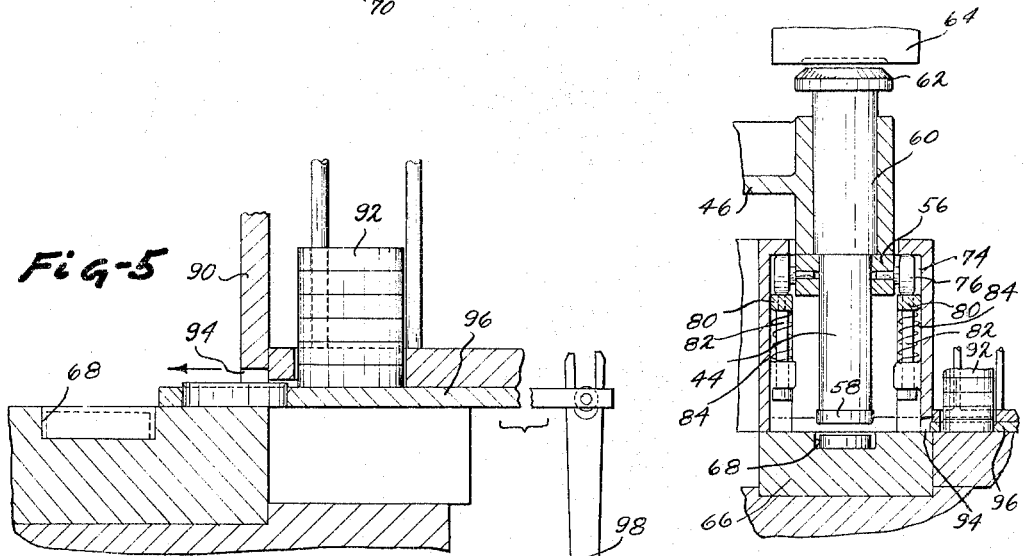
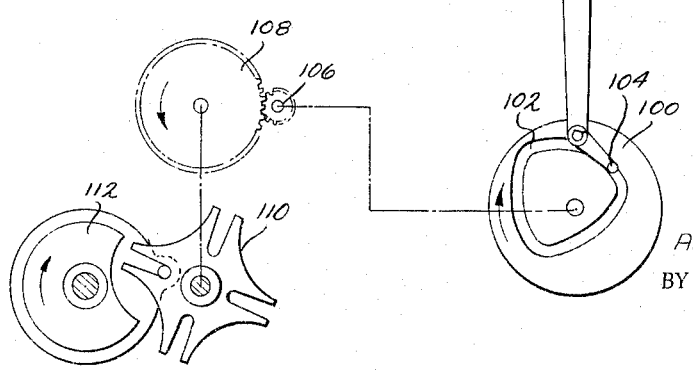

Dec. 6, 1966          A. CLEMENTS          3,289,450
CAN EXTRUSION MACHINE
Filed Nov. 26, 1963                 4 Sheets-Sheet 4

INVENTOR.
ALBERT CLEMENTS
BY Toulmin & Toulmin
ATTORNEYS

United States Patent Office 3,289,450
Patented Dec. 6, 1966

3,289,450
CAN EXTRUSION MACHINE
Albert Clements, Hamilton, Ohio, assignor to Minster Machine Company, Minster, Ohio, a corporation of Ohio
Filed Nov. 26, 1963, Ser. No. 326,045
9 Claims. (Cl. 72—267)

This invention relates to a method and apparatus for extruding cans and is particularly concerned with the high speed forming of can bodies by an extrusion process in a press having an extremely short stroke.

Cans such as for food stuffs, beverages, and the like are usually made by rolling up strip material to form a tube and cutting the tube off to length and then putting tops and bottoms in the tube length thus formed.

While this makes satisfactory cans, it also involves considerable labor and machinery and is not as fully conserving of material as might be possible. The present invention proposes to produce an extruded can wherein the bottom and the side walls of the can are formed at one time and are thus integral with each other whereby the can requires only a can lid placed therein to make a complete can structure. The formation of cans in this manner has the possibility of being extremely rapid and to be conserving of material since the minimum amount of can material is wasted in forming seams and joints.

One of the difficulties in connection with the extrusion of cans however has always been that extrusion processes were too slow because of the length of the stroke required for stripping the extruded can body from the extruding punch. Still further, a rather large and expensive press is required for making extrusions of this nature, and on account of the type of work operation being performed on the press, the full capabilities of the press are not developed.

This lack of development of the press capabilities comes about because in the extrusion process the portion of the stroke of the press that the slide is under load and which is at the time of impact of the slug and the period that the slug is extruding upwardly about the press is extremely short, and thus most of the travel of the slide is substantially idle travel. Because of these drawbacks the extrusion of can bodies in presses has not heretofore been practical or, at least, it has not been at all competitive with conventional can manufacturing methods as referred to above.

With the foregoing in mind, a primary object of the present invention is the provision of a method and apparatus for extruding can bodies and involving the use of a mechanical press in which the foregoing disadvantages that heretofore have obtained in this type of work are eliminated.

A particular object of this invention is the provision of a method and apparatus involving the use of a mechanical press in which an extremely short stroke press is operable for extruding can bodies of conventional length and at an extremely rapid rate.

Still another object of this invention is the provision of a mechanical press arrangement in which the working load on the press is distributed over a greater portion of the working cycle than has heretofore been done, thus enabling a press of any given size to carry a heavier workload than would normally be considered possible.

A still further object of this invention is the provision of a mechanical press arrangement for automatically producing can bodies at a rapid rate and wherein the press automatically adjusts itself to maintain the bottom of the can body being extruded within the accepted limits.

These and other objects and advantages of this invention will become more apparent upon reference to the following specification taken in connection with the accompanying drawings, in which:

FIGURE 4 is a developed view showing a cam arrangement forming a part of the structure and by means of which can bodies are stripped from the extruding punches as the turret indexes.

FIGURE 5 is a sectional view indicated by line 5—5 on FIGURE 3 and somewhat schematically illustrating an arrangement for feeding slugs to an extrusion station.

FIGURE 6 is a sectional view indicated by line 6—6 on FIGURE 4 and showing a yieldable track section located in the cam arrangement at the extrusion station.

Figure 10:
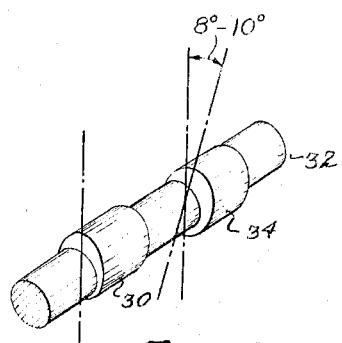
Figure 9:
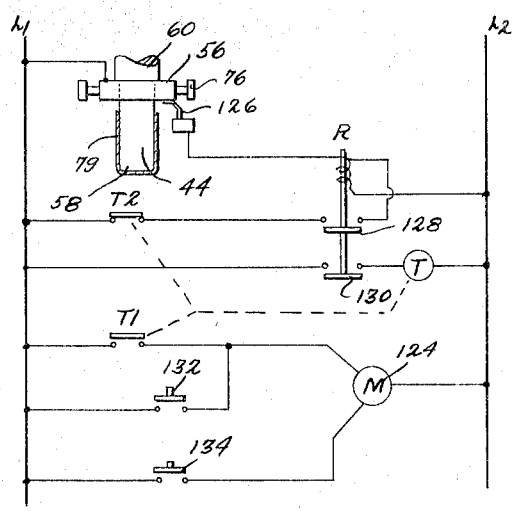

FIGURE 9 is a diagrammatic view showing an electric circuit pertaining to one of the eccentric pin adjusting motors for operating the motor to maintain the bottoms of the extruded can bodies of the proper thickness, and FIGURE 10 is a perspective view showing a novel crankshaft according to the present invention wherein two throws or crank pins of the crankshaft are slightly offset angularly from each other for causing sequential operation of their respective slides.

*General arrangement*

According to the present invention an extremely short stroke press structure is provided, the said stroke only being what is required to bring about the extrusion of a slug by an extrusion punch which is separate from the press slide, and the retraction of the punch from the extruding die to permit indexing of the punch away from the die, while the stripping of the extruded can body from the punch is accomplished by the stripping of the can body from the punch during the indexing movement of the punch. To this end, the extrusion punches are carried by a turret and the punches will move away from the press slide so that the slide merely reciprocates while the turret indexes and dwells, and during the dwell period the extrusion is accomplished, while during the indexing period ejecting of the extruded work pieces is accomplished.

According to the particular development of the present invention, a press is provided with two adjacent slides and these slides are actuated from a crankshaft having two throws that are slightly displaced from each other angularly. By so arranging the crankshaft, the slides operate essentially in sequence so that the peak loads on the respective slides do not coincide. This greatly increases the possible work that can be done by the press, up to substantially twice what could be done in the press without the double sequentially actuating slides.

While the slides operate sequentially with respect to the work done thereby, the slides reciprocate substantially in unison with respect to advancing toward working position and retracting therefrom so that ample time is available for the punch carrying turret to index between one working stroke of the press and the next.

According to a still further development of the present invention, the lowermost position of the extrusion punch is detected and this can be utilized for adjusting the slide position relative to the crankshaft so that the can bottoms will always be of about the same thickness. An adjustment of this nature is necessary because the lowermost position of the punch will be different when the press is cold than after the press has warmed up and parts thereof have expanded. Specifically, the can bottom tends to thin out as the press warms up and this is compensated for by adjusting the punch carrying slide upwardly through the medium of an eccentric pin connecting the slide with its actuating connecting rod.

While the invention is particularly disclosed and described in this application as involving a rotary turret and two punch actuating slides, it is also contemplated to have a shuttling type indexing punch carrying fixture, and in this case, more than two slides could be employed if so desired. With an arrangement of the nature wherein the indexing of the punch carrying member was linear rather than rotary, the same general mode of operation would obtain in that movement of the indexing punch carrying member to carry punches away from the extrusion would be accompanied by stripping of the extruded work piece therefrom.

According to a further modification contemplated by the present invention, the lowermost position reached by the extrusion punch is measured by measuring the strain on the actuating connecting rod therefor as by means of strain gages mounted on the connecting rod; and these gages would then be connected in an electric control circuit associated with the eccentric pin adjusting motor to that connecting rod, and in this manner, the maximum load on the extrusion punch could be maintained within predetermined limits, and this would form a relatively reliable indication of the thickness of the bottom of the can body being made.

Structural arrangement

The press according to the present invention comprises a bed 10 and a head 12 and extending therebetween are the spaced uprights 14. According to this invention there is dependent from about the middle of head 12 a center gib member 16, and between gib member 16 and each of uprights 14 is a press slide. The press slide at the left is numbered 18 and at the right side is numbered 20. Each slide is connected to an actuating connecting rod 22, 24 respectively by the eccentric pin means 26, 28 respectively. At its upper end connecting rod 22 engages throw 30 of crankshaft 32 whereas the upper end of connecting rod 24 engages throw 34 of the crankshaft.

The crankshaft is rotatably supported in the head on suitable substantially conventional bearing means 36 and is adapted for being driven in rotation by a motor 38 via a clutch 40 with which may be associated a brake 42 for braking the crankshaft to the press frame when the clutch is deenergized.

The throws 30 and 34 of the crankshaft, as will best be seen in FIGURE 10, have their corresponding diameters inclined at an angle of about 8 to 10° of each other, whereby the slides, while generally moving upwardly and downwardly at the same time, are spaced chronologically with respect to reaching their lowermost positions, to substantially separate the loads imposed on the slides during an extrusion cycle so that the crankshaft and clutch, drive motor and press frame are not overloaded and whereby the press can do substantially twice the extrusion work that would be possible if no time differential existed between slide strokes.

According to the present invention each slide is arranged to actuate a pair of extrusion punches 44 with these punches being independently and reciprocably carried in an indexing carrier 46. Specifically, carrier 46 is in the form of a rotary turret in the modification illustrated and is arranged to index an angle of 90° for each complete revolution of crankshaft 32. Indexing of the turret is accomplished by mounting turret 46 on an indexing shaft 48 that is indexed from position to position by a roller gear indexing drive 50 having input shaft 52 connected by the double right angle drive 54 with the crankshaft 32.

Roller gear drives of this nature are known in the art and comprise a plurality of rollers carried by shaft 48 and engaging a modified worm which is operable for producing rapid indexing movement followed by a dwell movement of the desired period of time.

Each punch 44 has a stripping collar 56 slidable on the reduced diameter lower portion 58 of the punch on which the can body is formed. Immediately above stripping collar 56 there is a larger diameter portion 60 of the punch which is the portion thereof that is reciprocable in the turret 46 and at the extreme upper end of the punch is a head 62 larger than portion 60 and which head is adapted for being engaged by an anvil 64 carried on the bottom of the pertaining press slide.

In each extrusion station there is a die member 66 for each punch having a shallow recess 68 for receiving the slug to be extruded. When the slug is placed in the recess and the extrusion punch is driven downwardly against the slug the material of the slug will flow upwardly along the side of the punch, as is well known in extrusion practices. By properly shaping the punch and die the complete side walls and bottom of a can body can be formed in a single press stroke for each punch.

This requires, for the actual extrusion, only a short stroke of, say, a small fraction of an inch so that the total press stroke, including advance of the punch to the slug and retraction therefrom, could easily be as short as one inch between uppermost position and lowermost position. With a stroke as short as one inch, the slides can be actuated at high speed and the small eccentricities of the crankshaft throws permit high pressures on the punches to be developed without an excessively large drive motor.

As will be seen in FIGURE 3, there are two punches 44 in the extrusion station for each of slides 18 and 20 so that for each complete revolution of crankshaft 32, four can bodies will be made. With the press running at the reasonable speed of 150 revolutions of the crankshaft per minute, there will be extruded 600 can bodies complete with bottoms, but without tops, for every minute the press operates.

It has been mentioned that the indexing member 46 is operable for carrying the extrusion punches away from extrusion position, and that while the punches are moving in this direction, the can bodies thereon are stripped from the punches so that the punches are again ready for another extrusion cycle.

Figure 1:
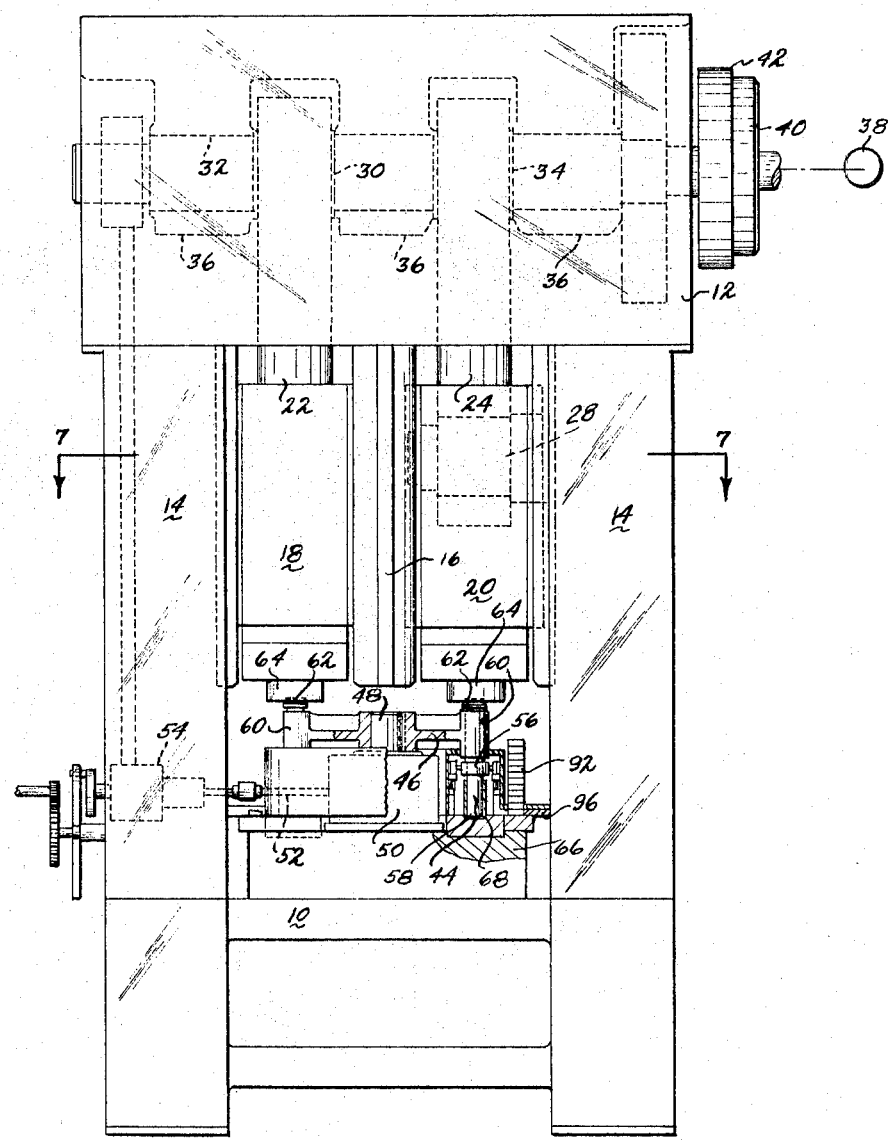
FIGURE 1 is a front view, somewhat schematic, of a press according to the present invention and with a portion of the die arrangement broken away to show the die structure.
Figure 2:
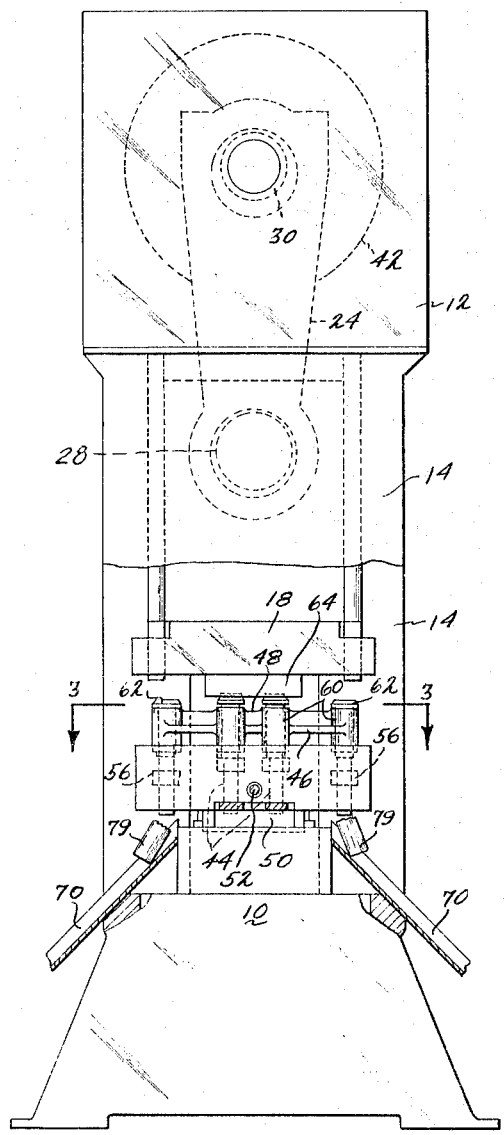
FIGURE 2 is a side view of the press partly broken away.
Figure 3:
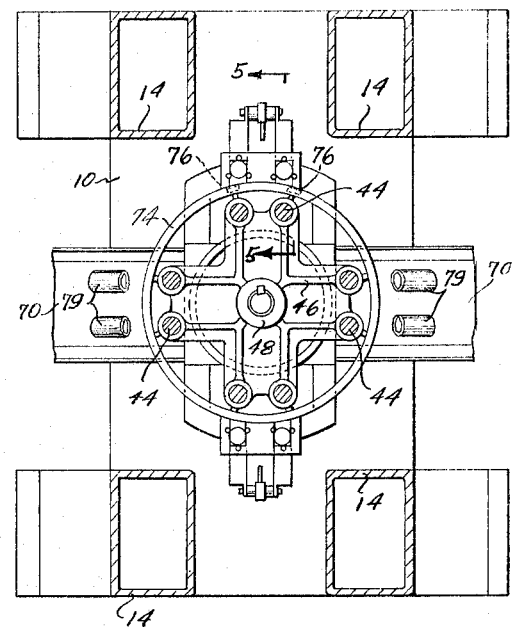
FIGURE 3 is a plan sectional view indicated by line 3—3 on FIGURE 2 showing an indexing turret forming a part of the structure of the present invention.

As will be seen in FIGURES 2 and 3, the discharge stations to which the punches are moved and wherein are provided discharge chutes 70, are 90° away from the extrusion stations and are disposed outside the path of the press slides so that the punches merely rest idly in the stripping stations.

The stripping of the can bodies from each punch is accomplished by forcing the stripper ring 56 downwardly on portion 58 of the punch while the punch is supported in the indexing turret 46. The forcing downwardly of the stripper ring is accomplished by stationary track means along which the stripper rings move during indexing and which means force the rings downwardly. This will be seen in FIGURE 4 wherein the stationary track means are illustrated fragmentarily in developed form. The track means comprise groove means 74 in which rollers 76 carried by the rings 56 are received.

The track means decline as the punches and their stripper rings move from the extrusion station toward the discharge station and this will, as is evident in FIGURE 4, strip the extruded can body 79 from the respective punch 44.

Inasmuch as the punches are required to be held in elevated positions when moved into extrusion position, this is conveniently done by forming the track means so that the stripper rings for the punches are moved upwardly and abut the shoulder between portions 58 and 60 of the punches and lift them to the proper height. This, in turn, requires that the stripper rings be permitted to move downwardly during the extrusion operation so that the punches can also moved downwardly. This can be accomplished by forming the track means with a movable portion as at 80 in each extrusion station.

These portions 80 are supported on rods 82 and are urged upwardly by springs 84 so that the movable sections 80 will hold the stripper rings and the respective punches in an elevated position until the press slide comes down, and at which time the track sections 80 yield and permit the stripper rings to move downwardly and the punches to move downwardly also and thereby carry out the extrusion operation.

It is necessary, of course, to feed a new slug into each die following one extrusion stroke and prior to the next extrusion stroke, and I find this can be accomplished by an arrangement of the nature illustrated in FIGURE 5 which shows the feeding station associated with one extrusion die. This feeding arrangement comprises a tube 90 into which a stack of slugs 92 is placed, the feed tube being open at 94 to permit one slug at a time to be fed off the bottom by feed slide 96 and to be moved over the die so as to drop into the cavity 68 thereof.

Feed slide 96 can be reciprocated in timed relation to the rotation of the crankshaft in any suitable manner, as by an oscillatory actuating lever 98, for example, operated by a rotary cam member 100 having a cam track 102 engaging roller 104 of lever 98. Cam member 100 is connected to a shaft with a pinion 106 driven by gear 108 four times as large as the pinion, and gear 108 is driven by the Geneva driver 110, which can receive power from driver 112 that could be associated, for example, with the double right angle drive 54 so that driver 112 rotates in unison with the crankshaft.

Figure 7:
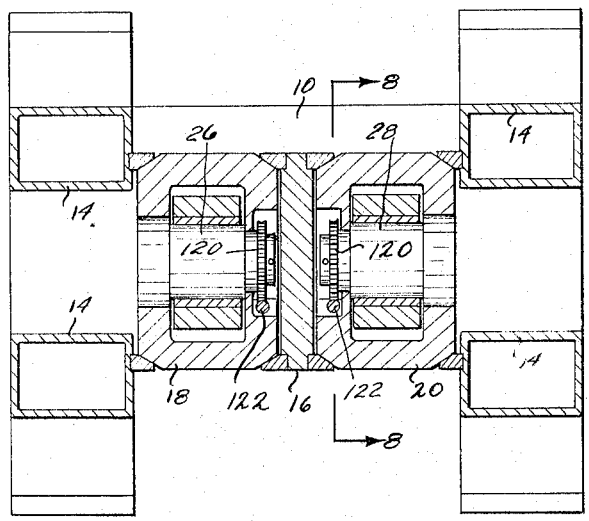
FIGURE 7 is a plan sectional view indicated by line 7—7 on FIGURE 1 showing the two slides of the press and the connection thereto of the actuating connecting rods.
Figure 8:
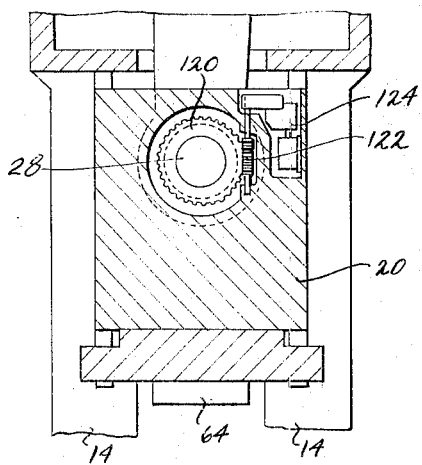
FIGURE 8 is a sectional view indicated on line 8—8 of FIGURE 7 showing a motorized adjusting mechanism for the eccentric pins that connect the connecting rods with the slides.

The eccentric pin means 26, 28 connecting each slide to its pertaining crankshaft are adapted for being adjusted by means of a motor carried by the pertaining slide as is illustrated in FIGURES 7 and 8. In these figures it will be seen that each of the eccentric pin means 26, 28 carries an eccentric pin driver gear 120 which meshes with a worm 122 driven by the slow speed output shaft of a reversible geared head motor 124 carried by the slide.

This motor is connected in a control circuit as illustrated in FIGURE 9 for being operated to adjust the punch position. FIGURE 9 taken together with FIGURE 6 will show that there is a contact element or switch 126 positioned to be engaged by the punch stripper ring 56 at a predetermined lowered position of the stripper ring. When contact 126 is engaged by the stripper ring, a relay R is energized which is held or sealed in through its blade 128. Relay R has another blade 130 that closes to effect energization of a timer T. The timer has a blade T1 that closes at about the time the press slide reaches its uppermost position and this will effect energization of motor 124 to run in a direction to move the slide upwardly relative to its connecting rod. Since the adjustment normally required is quite small, blade T1 remains closed only a brief period. As soon as blade T1 opens, a second blade T2 of the timer opens and deenergizes relay R and the adjusting operation is complete.

What occurs is that as the press warms up and parts thereof expand, the bottom of the can tends to thin out so that when the punch 44 travels too far, contact 126 will be engaged and this will bring about the aforementioned adjustment of the punch upwardly.

In this manner the can bottom is prevented from coming out too thin.

The circuit of FIGURE 9 can also include the manual switches 132 and 134 for reversibly energizing motor 124 to accomplish manual adjustment of the punch position. The circuit could, of course, be elaborated to the point that the punch would be automatically adjusted in both directions, but under normal circumstances, it is sufficient to compensate for the thinning out of the can bottom due to expansion of the press parts as has been described.

As mentioned previously, the connecting rod could carry strain gages and these could be employed, in accordance with the load on the rod, for adjusting the punch in the proper direction.

It will be understood that this invention is susceptible to modification in order to adapt it to different usages and conditions; and accordingly, it is desired to comprehend such modifications within this invention as may fall within the scope of the appended claims.

I claim:

1. In an extrusion press the combination of: a press frame having a bed, a press slide slidably guided in said press frame for movement toward and away from said bed, a crankshaft in the press frame, a connecting rod connecting the crankshaft with the slide, an extrusion die on the bed, an extrusion punch mounted independently of said press slide on said press bed for lateral movement, and means for interposing the punch between the slide and the die for carrying out an extrusion operation upon movement of the slide toward the bed and for moving the punch laterally out of punching position upon retraction of the slide from the bed.

2. In an extrusion press the combination of: a press frame having a bed, a press slide slidably guided in said press frame for movement toward and away from said bed, a crankshaft in the press frame, a connecting rod connecting the crankshaft with the slide, an extrusion die on the bed, an extrusion punch mounted independently of said press slide on said press bed for lateral movement, means for interposing the punch between the slide and the die for carrying out an extrusion operation upon movement of the slide toward the bed, means for moving the punch laterally out of punching position upon retraction of the slide from the bed, said means for interposing the punch between the slide and die and for moving the punch out of punching position comprising a movable punch carrier, and means connecting the punch carrier to the crankshaft for operation thereby in unison with the movement of the said slide.

3. In an extrusion press the combination of: a press frame having a bed, a press slide slidably guided in said press frame for movement toward and away from said bed, a crankshaft in the press frame, a connecting rod connecting the crankshaft with the slide, an extrusion die on the bed, an extrusion punch, means for interposing the punch between the slide and the die for carrying out an extrusion operation upon movement of the slide toward the bed, means for moving the punch laterally out of punching position upon retraction of the slide from the bed, said means for interposing the punch between the slide and die and for moving the punch out of punching position comprising a movable punch carrier mounted on the bed independently of said press slide, and means connecting the punch carrier to the crankshaft for operation thereby in unison with the movement of the said slide, said punch carrier being operable for moving another punch into punching position simultaneously with moving a punch out of punching position.

4. In an extrusion press the combination of: a press frame having a bed, a press slide slidably guided in said press frame for movement toward and away from said bed, a crankshaft in the press frame, a connecting rod connecting the crank shaft with the slide, an extrusion die on the bed, an extrusion punch, means for interposing the punch between the slide and the die for carrying out an extrusion operation upon movement of the slide toward the bed, means for moving the punch laterally out of punching position upon retraction of the slide from the bed, said means for interposing the punch between the slide and die and for moving the punch out of punching position comprising a movable punch carrier mounted on the bed independently of said press slide, means connecting the punch carrier to the crankshaft for operation thereby in unison with the movement of the said slide, said punch carrier being operable for moving another punch into punching position simultaneously with moving a punch out of punching position, and feeding means operable for feeding a slug to be extruded to said die following one working stroke of said slide and prior to the next working stroke thereof.

5. In an extrusion press the combination of: a press frame having a bed, a press slide slidably guided in said press frame for movement toward and away from said bed, a crankshaft in the press frame, a connecting rod connecting the crankshaft with the slide, an extrusion die on the bed, a plurality of extrusion punches, means for interposing a punch between the slide and the die for carrying out an extrusion operation upon movement of the slide toward the bed, means for moving the interposed punch laterally out of punching position upon retraction of the slide from the bed, said means for interposing the punch between the slide and die and for moving the punch out of punching position comprising a rotary punch carrier, said punches being vertically reciprocable in said carrier, each punch having a collar slidable thereon, and track means surrounding the punch carrier engaging said collars for lifting the punches in the carrier as they are moved into extrusion position, said track means comprising yieldable means for permitting downward movement of said punches during an extrusion operation.

6. In an extrusion press the combination of: a press frame having a bed, a press slide slidably guided in said press frame for movement toward and away from said bed, a crankshaft in the press frame, a connecting rod connecting the crankshaft with the slide, an extrusion die on the bed, a plurality of extrusion punches, means for interposing a punch between the slide and the die for carrying out an extrusion operation upon movement of the slide toward the bed, means for moving the interposed punch laterally out of punching position upon retraction of the slide from the bed, said means for interposing the punch between the slide and die and for moving the punch out of punching position comprising a rotary punch holder, said punches being reciprocable in the vertical track in said holder, a collar slidable on each punch beneath the carrier, each punch being shouldered above the respective collar track means adjacent said holder, means on the collars engaging the track means, said track means being formed to move the collars and punches upwardly as the punches move into extrusion position, said track means including a yieldable section in the extrusion position so the punches can yield downwardly in the carrier for an extrusion operation, and said track means also including means for moving the collars downwardly on the punches as the punches move out of extrusion position thereby to strip extrusions therefrom.

7. In an extrusion press the combination of: a press frame having a bed, a plurality of press slides guided in said press frame for movement toward and above said bed, a crankshaft in the press frame, a plurality of throws on the crankshaft angularly displaced from each other and respectively connected with said slides for actuation thereof, an extrusion station on the press bed in alignment with each slide and each said extrusion station comprising extrusion die means, punch means pertaining to each die means operable by the respective slide, a rotary carrier supporting said punch means and connected with the crankshaft to be driven in unison therewith, a collar on each punch means, track means adjacent the carrier engaging said collars for lifting the punch means so that rotary movement of the carrier will interpose the punch means between the die means and the respective slide, said track means including yieldable sections at each extrusion station for permitting downward movement of the punch means by the respective slides, and said track means being so formed that said collars are moved downwardly on the punch means as the punch means are indexed away from the respective extrusion stations thereby to strip extrusions from the punch means.

8. In an extrusion press the combination of: a press frame having a bed, a pair of press slides slidably guided in said frame for movement toward and away from said bed, a crankshaft in said press frame having a throw pertaining to each slide connected to the respective slide and said throws being offset angularly from each other, an extrusion station on the bed in alignment with each slide and each extrusion station comprising a pair of extrusion dies, a rotary punch carrier on the bed, punches reciprocably mounted in said carrier, a collar slidable on each punch beneath the carrier, each punch being shouldered above its pertaining collar, a track surrounding said carrier, means on the collars engaging said track, said track being formed to move the collars and punches upwardly as the punches move into the respective extrusion stations, said track comprising yieldable sections in said extrusion stations so the punches and collars can move downwardly when engaged by the respective slides and carry out an extrusion operation, said track also being formed for moving the collars downwardly on the punches as the punches move away from said extrusion stations to strip work pieces from the punches, and means connecting the carrier with the crankshaft for indexing the carrier in response to rotation of the crankshaft.

9. In an extrusion press the combination of: a press frame having a bed, a pair of press slides slidably guided in said frame for movement toward and away from said bed, a crankshaft in said press frame having a throw pertaining to each slide connected to the respective slide and said throws being offset angularly from each other, an extrusion station on the bed in alignment with each slide and each extrusion station comprising a pair of extrusion dies, a rotary punch carrier on the bed, punches reciprocably mounted in said carrier, a collar slidable on each punch beneath the carrier, each punch being shouldered above its pertaining collar, a track surrounding said carrier means on the collars engaging said track, said track being formed to move the collars and punches upwardly as the punches move into the respective extrusion stations, said track comprising yieldable sections in said extrusion stations so the punches and collars can move downwardly when engaged by the respective slides and carry out an extrusion operation, said track also being formed for moving the collars downwardly on the punches as the punches move away from said extrusion stations to strip work pieces from the punches, and means connecting the carrier with the crankshaft for indexing the carrier in response to rotation of the crankshaft, feeding means associated with each pair of extrusion dies, and means connected with the crankshaft for operating said feeding means to feed slugs into the extrusion dies.

References Cited by the Examiner

UNITED STATES PATENTS

| | | | |
|---|---|---|---|
| 72,505 | 12/1867 | Kirby | 83—530 |
| 607,165 | 7/1898 | Freese | 83—519 |
| 1,712,259 | 2/1929 | Davis | 72—267 |
| 2,404,351 | 7/1946 | Anderson | 100—257 |
| 2,477,587 | 8/1949 | Doutt | 83—530 |
| 2,910,898 | 11/1959 | Martindell | 100—257 |
| 3,030,878 | 4/1962 | Holzer | 100—237 |
| 3,162,232 | 12/1964 | Munschauer et al. | 72—441 |

FOREIGN PATENTS 528,497  10/1940  Great Britain.

CHARLES W. LANHAM, Primary Examiner.

H. D. HOINKES, Assistant Examiner.